*(12)* United States Patent
Morishita et al.

(10) Patent No.: US 7,152,417 B2
(45) Date of Patent: Dec. 26, 2006

(54) BATTERY COOLING APPARATUS WITH SUFFICIENT COOLING CAPACITY

(75) Inventors: Yusuke Morishita, Kuwana (JP); Yoshimitsu Inoue, Chiryu (JP)

(73) Assignee: Denso Corporation, Kariya (JP)

( * ) Notice: Subject to any disclaimer, the term of this patent is extended or adjusted under 35 U.S.C. 154(b) by 251 days.

(21) Appl. No.: 10/785,753

(22) Filed: Feb. 24, 2004

(65) Prior Publication Data

US 2004/0163398 A1  Aug. 26, 2004

(30) Foreign Application Priority Data

Feb. 25, 2003  (JP)  ............... 2003-047508

(51) Int. Cl.
*F25D 17/04*  (2006.01)
*F25D 23/12*  (2006.01)

(52) U.S. Cl. ...................... 62/186; 62/259.2

(58) Field of Classification Search ............... 62/259.2, 62/418, 505, 514, 178, 180, 186, 407, 408; 236/49.3; 361/688
See application file for complete search history.

(56) References Cited

U.S. PATENT DOCUMENTS 5,582,234 A * 12/1996 Samukawa et al. ......... 165/204
5,937,664 A * 8/1999 Matsuno et al. ............ 62/259.2
5,983,657 A * 11/1999 Murata et al. ............. 62/228.3
6,220,383 B1   4/2001 Muraki et al.

FOREIGN PATENT DOCUMENTS

JP        10252467       9/1998
JP        2001-291532    10/2001

* cited by examiner

*Primary Examiner*—Cheryl Tyler
*Assistant Examiner*—Michael J. Early
(74) *Attorney, Agent, or Firm*—Harness, Dickey & Pierce, PLC

(57) ABSTRACT

A battery cooling apparatus for positively cooling an in-vehicle battery is disclosed. Air that has passed through a cooler (5) is supplied to batteries (1), and only internal air, but not external air, passes through the cooler (5). In this way, the batteries (1) can be cooled without being greatly affected by the disturbances such as the heat of an exhaust pipe and sunlight. Thus, the batteries (1) can be sufficiently cooled without increasing the heat radiation area, i.e. the surface area of the batteries (1). Noise of cooling air flow can be reduced while at the same time suppressing increases in both size and production cost of the battery.

10 Claims, 6 Drawing Sheets

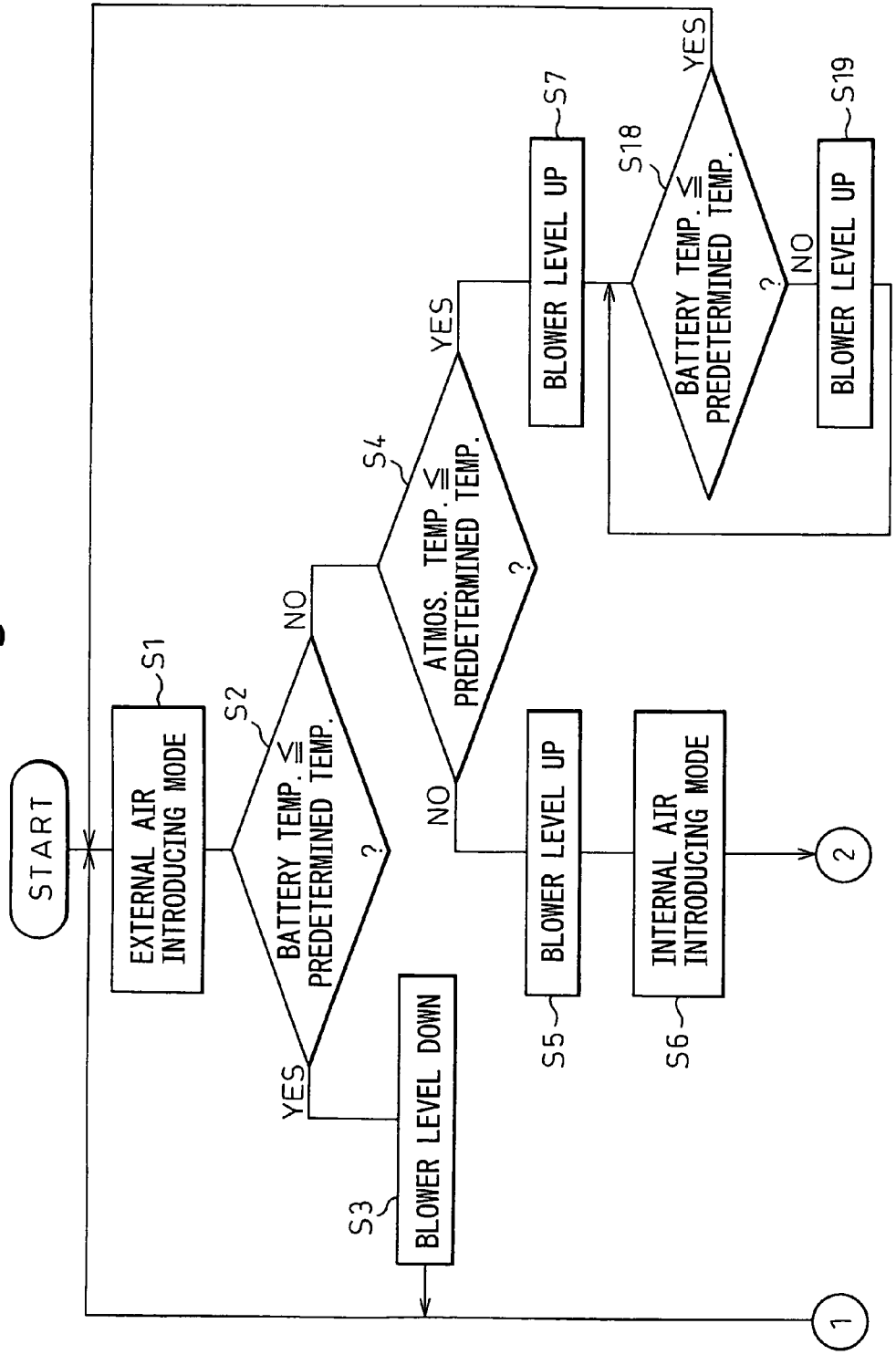

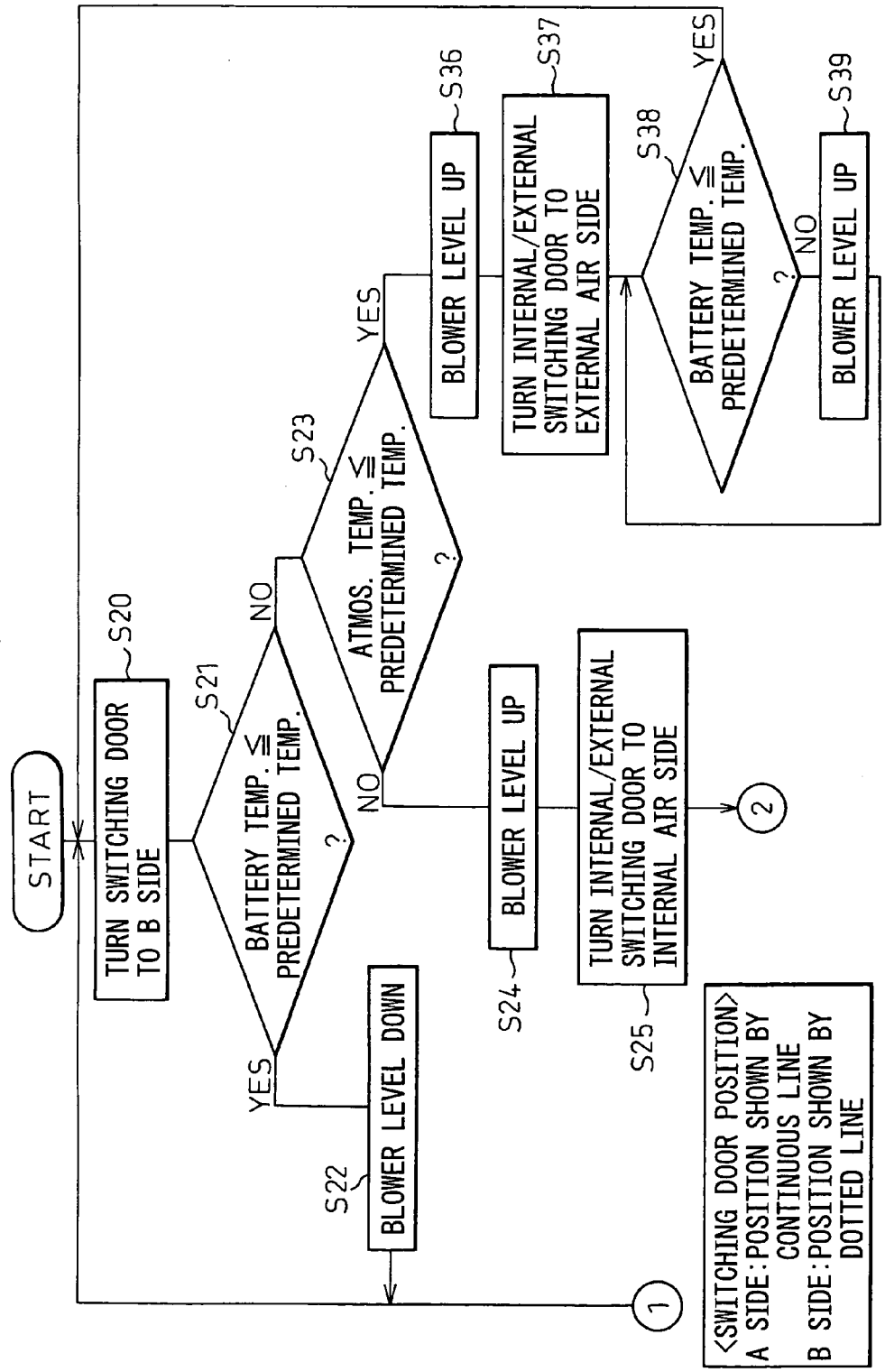

BATTERY COOLING APPARATUS WITH SUFFICIENT COOLING CAPACITY

BACKGROUND OF THE INVENTION

1. Field of the Invention

The present invention relates to a battery cooling apparatus for controlling the temperature of a battery mounted on an automotive vehicle.

2. Description of the Related Art

In a conventional battery cooling apparatus for cooling an in-vehicle battery, air in a compartment of the vehicle is blown against the battery to cool the battery (Japanese Unexamined Patent Publication No. 10-252467).

A battery for supplying power to a driving motor of an electric car or a hybrid car is mounted normally in the neighborhood of a rear seat in the rear part of a vehicle body. Therefore, an air inlet for a battery cooling apparatus is also arranged in the rear part of the vehicle body such as under the rear seat, or a rear tray (or a trunk space) as described in the publication cited above.

The temperature of air blown into the compartment of the vehicle from an air conditioner, on the other hand, though dependent on air-conditioning parameters, such as a set temperature and an internal air temperature, is normally controlled at about 25° C. In the case where the air inlet of the battery cooling apparatus is arranged in the rear part of the vehicle body under the rear seat or the rear tray, for example, the temperature of air sucked into the air inlet rises to as high as about 30° C. to 31° C. due to disturbances such as the heat of an exhaust pipe and sunlight.

It is, therefore, difficult to cool the battery sufficiently and, in order to secure a sufficient cooling ability, the flow rate of air supplied to the battery is required to be increased, thereby leading to the problems of increased noise of air flow and shorter service life of a blower.

Also, an increased heat radiation area, i.e. an increased surface area of the battery to secure a sufficient cooling capacity would increase both size and production cost of the battery.

SUMMARY OF THE INVENTION

In view of the above-mentioned problems, the object of this invention is to provide a novel battery cooling apparatus different from the conventional battery cooling apparatus and thereby to solve at least one of the problems described above.

In order to achieve the above-mentioned object of the invention, according to a first aspect of the invention, there is provided a battery cooling apparatus for cooling batteries (1) mounted on a vehicle, comprising: blowing means (3, 4) having an internal air blowing mode for sucking air from inside a compartment of the vehicle and blowing the air to the batteries (1); and a cooling means for cooling the air blown to the batteries (1) only in the internal air blowing mode.

The batteries (1) can thus be cooled without being greatly affected by disturbances such as the heat of an exhaust pipe or sunlight. The batteries (1) can be cooled sufficiently without increasing a heat radiation area, i.e. a surface area of the batteries (1), considerably. Therefore, noise of cooling air flow can be reduced while suppressing increase in size and production cost of the battery at the same time.

According to a second aspect of the invention, there is provided a battery cooling apparatus for cooling batteries (1) mounted on an automotive vehicle, comprising: a blower (3) for blowing air to the batteries (1); an internal/external air switching unit (4) arranged at an inlet side of the blower (3) and controlling the flow rate of the air from inside a compartment supplied to the blower (3) and flow rate of air from outside a compartment of the vehicle supplied to the blower (3); and a cooling means (5) arranged in an air path leading from an internal air inlet (4a) of the internal/external air switching unit (4) to an inlet of the blower (3) and cooling the air.

According to a third aspect of the invention, there is provided a battery cooling apparatus for cooling batteries (1) mounted on an automotive vehicle, comprising a mode setting means for selecting one of: an external air cooling mode for cooling the batteries (1) with air from outside the compartment of the vehicle; an internal air cooling mode for cooling the batteries (1) with an air from inside the compartment; and a refrigerator cooling mode for cooling the batteries (1) with air from inside the compartment cooled by the cooling means (5).

Incidentally, the reference numerals in the parentheses attached to means described above represent an example of correspondence with specific means described in the embodiments below.

The present invention may be more fully understood from the description of the preferred embodiments of the invention set forth below, together with the accompanying drawings.

BRIEF DESCRIPTION OF THE DRAWINGS in the drawings:

FIG. 2A is an upstream section of a flowchart showing the control operation of the battery cooling apparatus according to the first embodiment of the invention.

FIG. 4A is an upstream section of a flowchart showing the control operation of the battery cooling apparatus according to the second embodiment of the invention.

DESCRIPTION OF THE PREFERRED EMBODIMENTS (First Embodiment)

Figure 1:
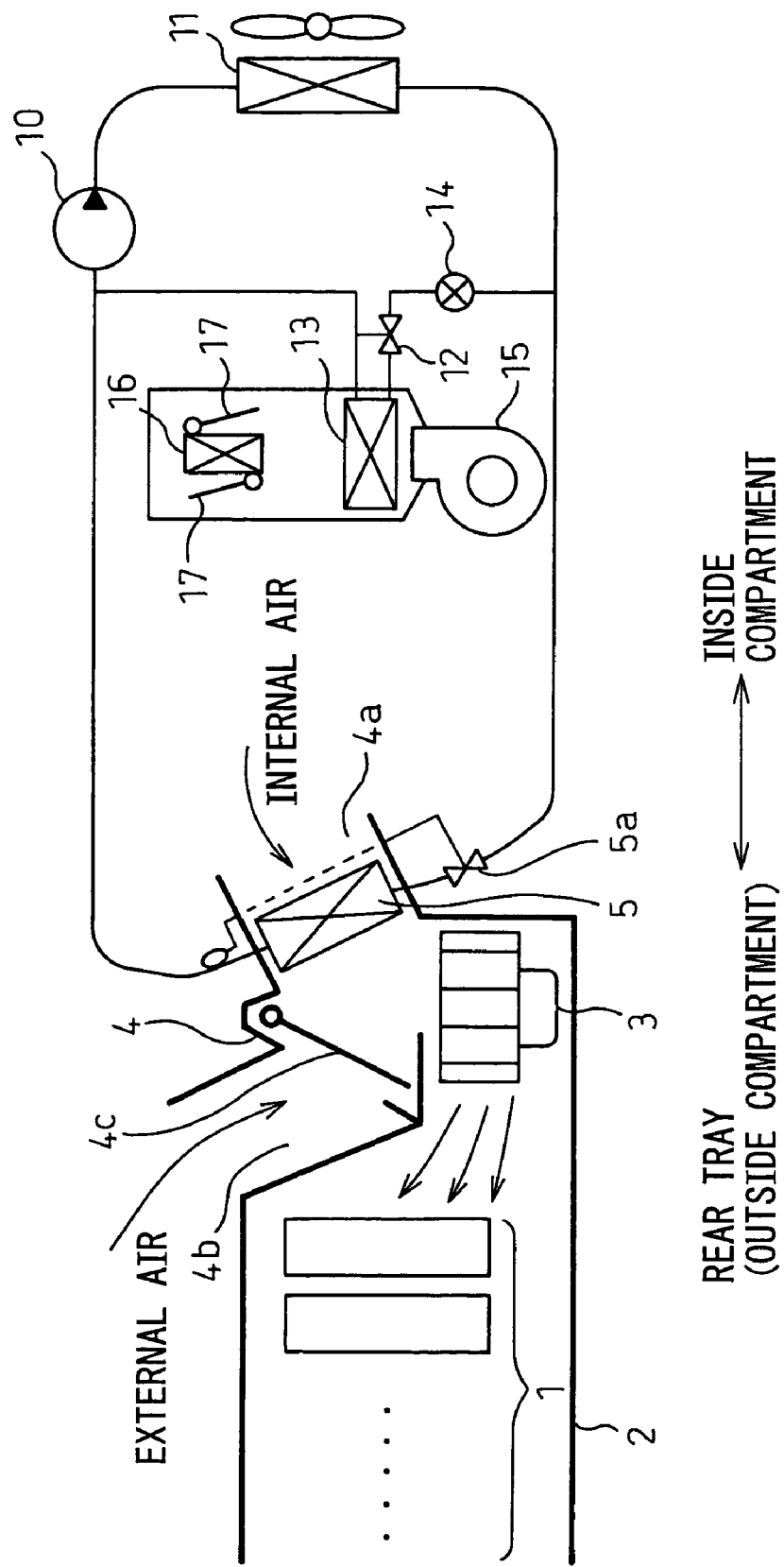
FIG. 1 is a schematic diagram showing a battery cooling apparatus according to a first embodiment of the invention.

According to this embodiment, the invention is applied to a battery cooling apparatus for cooling the batteries mounted in a hybrid car adapted to be driven by a combination of a running internal combustion engine and a running electric motor. A schematic diagram of the battery cooling apparatus according to this embodiment is shown in FIG. 1.

The batteries 1 are chargeable/dischargeable secondary batteries for supplying electric power mainly to an electric motor for driving the car. A casing 2 is an air-conditioning duct for accommodating the batteries 1 and constitutes an air path for cooling the batteries. According to this embodiment, the air that has cooled the batteries 1 is discharged out of the car.

A blower 3 for blowing the cooling air onto the batteries 1 is arranged in the most upstream area of the casing 2 in the air flow and on the upstream side of the batteries 1 in the air flow. An internal/external air switching unit 4 for controlling flow rate of air, from the inside of the compartment, supplied to the blower 3 and flow rate of air, from the outside of the compartment, supplied to the blower 3 is arranged on the intake side of the blower 3.

The internal/external air switching unit 4 according to this embodiment includes an internal air inlet 4a communicating with the interior of the compartment, an external air inlet 4b communicating with the exterior of the compartment and an internal/external air switching door 4c for switching the open/close state of the internal air inlet 4a and the external air inlet 4b thereby to switch between the external air introduction mode and the internal air introduction mode and the like. The internal/external air switching door 4c is controlled by the electronic control device.

The blowing capacity of the blower 3 is controlled in five steps of suspension (off), minimum air flow rate (Lo), first intermediate air flow rate (Me1), second intermediate air flow rate (Me2) and maximum air flow rate (Hi). The air flow rate levels in the five steps Lo, Me1, Me2 and Hi are increased in that order.

A cooler 5 for cooling internal air sucked into the casing 2 from the internal air inlet 4a is arranged in that part of the air path leading from the internal air inlet 4a to the inlet side of the blower 3 which is nearer to the internal air inlet 4a.

The cooler 5 is an evaporator of a vapor compression refrigerator for cooling air utilizing the latent heat of vaporization of refrigerant and, according to this embodiment, the refrigeration capacity of the evaporator is secured by introducing part of refrigerant circulating in a vapor compression refrigerator for an air conditioner.

A compressor 10 sucks and compresses the refrigerant. A heat radiator 11 cools the refrigerant by exchanging heat between outdoor air and the high-temperature high-pressure refrigerant discharged from the compressor 10. The decompression unit 12 decompresses the refrigerant flowing into an evaporator 13 of an air conditioner. According to this embodiment, a temperature-type expansion valve is used, as the decompression unit 12, by adjusting the opening degree of the throttle of the expansion valve in such a manner as to attain a predetermined value of refrigerant degree of superheat at the refrigerant outlet side of the evaporator 13.

The decompression unit 5a is for reducing the pressure of the refrigerant flowing into the cooler 5, and according to this embodiment, a temperature-type expansion valve is employed for adjusting the opening degree of the throttle in such a manner as to secure a predetermined value of the refrigerant degree of superheat at the refrigerant outlet side of the cooling 5 as the decompression unit 12. As an alternative, a fixed throttle, such as a capillary tube or an orifice, may be employed.

A solenoid valve 14 is for opening/closing a refrigerant circuit connected to the evaporator 13. A blower 15 is a blowing means for the air conditioner. A heater 16 is a heating means for heating air blown into the compartment. An air mix door 17 adjusts the air flow rate passing through the heater 16. The heater 16 according to this embodiment uses, as a heat source, the waste heat generated in the vehicle (car), such as the waste heat of an engine.

According to this embodiment, the compressor 10 is driven by an electric motor and, during the cooling operation, the core portion of the heater 16 is closed by the air mix door 17, the rotational speed of the compressor 10 is controled and, thereby, the temperature of the air blown into the compartment is controlled. During a heating operation or a dehumidification operation, on the other hand, air is cooled to about the dew point or less by the evaporator, after which the opening degree of the air mix door 17, i.e. the flow rate of air passing through the core portion of the heater 16 is adjusted and, thereby controlling the temperature of the air blown into the compartment.

Next, the characteristic operation of the battery cooling apparatus according to this embodiment is explained.

The battery cooling apparatus according to this embodiment is adapted to cool the batteries 1 by appropriately selecting one of an external air cooling mode for cooling the batteries 1 with external air, an internal air cooling mode for cooling the batteries 1 with internal air and a refrigerator cooling mode for cooling the batteries 1 with the internal air inside the compartment cooled by the cooler 5.

Figure 2B:
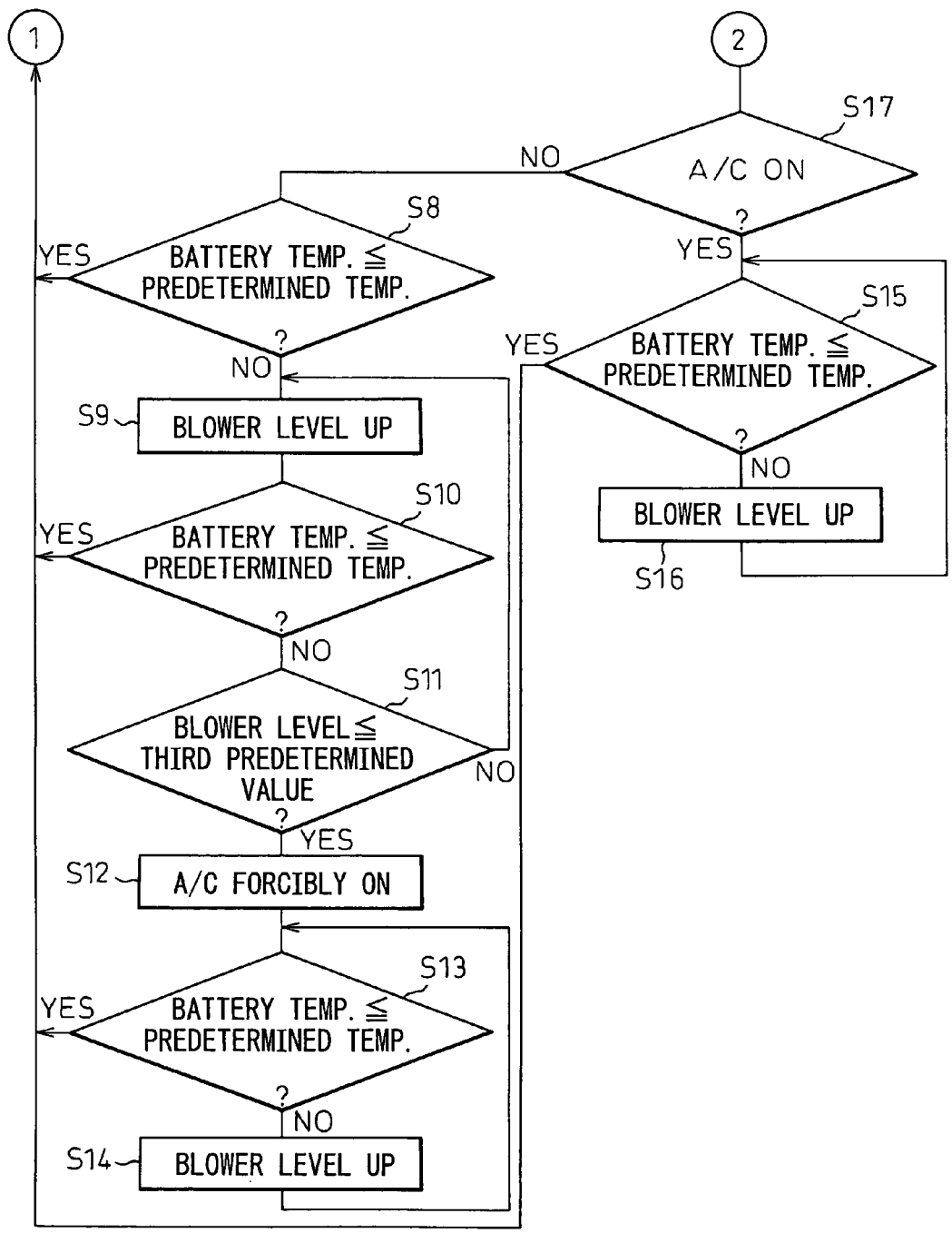
FIG. 2B is a downstream section of the flowchart in FIG. 2A.

In a basic operation, the electronic control device cools the batteries 1 by executing the cooling modes including the external air cooling mode, the internal air cooling mode and the refrigerator cooling mode, in that order. In the case where the batteries 1 cannot be cooled to lower than or equal to a predetermined temperature (say, 40° C.) even in the refrigerator cooling mode, a driver is warned to stop the vehicle. With reference to FIG. 2, the operation of the battery cooling apparatus is described in detail.

As soon as a vehicle starting switch is turned on, the internal/external air switching unit 4 is set to the external air introducing mode to select the external air cooling mode, after which it is determined whether the temperature Tb of the battery 1 is not higher than a predetermined temperature (say, 40° C.) (S1, S2). In the case where the battery temperature Tb is not higher than a predetermined temperature, the air flow rate of the blower 3 is reduced to one lower step (S3). The operation of the blower 3, if suspended in step S3, is kept suspended.

In the case where the battery temperature Tb is higher than a predetermined temperature, on the other hand, it is determined whether the temperature of the external air is not higher than a predetermined temperature (say, 25° C. to 26° C.) (S4). In the case where the external air temperature is higher than a predetermined temperature, an attempt is made to cool the batteries 1 in the internal cooling mode by setting the internal air introducing mode, while at the same time increasing the air flow rate of the blower 3 to one higher step (S5, S6). The blowing capacity of the blower 3, if already at Hi (maximum air flow rate), is maintained at that level.

Next, it is determined whether the air conditioner, i.e. the compressor 10 is operating or not (S7). In the case where the compressor 10 is suspended in operation, it is determined whether the battery temperature Tb is not higher than a predetermined temperature, i.e. whether the batteries 1 can be cooled in the internal air cooling mode or not (S8). In the case where the battery temperature Tb is not higher than the predetermined temperature, the process returns to step S1.

In the case where the battery temperature Tb is higher than the predetermined temperature, on the other hand, the blowing capacity of the blower 3 is increased within the range of not more than a second intermediate air flow rate of the blower 3 so as to reduce the battery temperature Tb to the predetermined level or lower by maintaining the internal air cooling mode (S9 to S11).

The second intermediate air flow rate corresponds to the maximum air flow rate to produce noise at which occupants of the compartment feel no great discomfort.

In the case where the battery temperature Tb fails to drop to the predetermined temperature even when the air is blown at the second intermediate air flow rate in the internal air cooling mode, the compressor 10 is forcibly operated, with the solenoid valve 14 closed, to start the cooling operation of the cooler 5, and the batteries 1 are cooled in the refrigerator cooling mode (S12). In the case where the battery temperature Tb is not decreased below the predetermined temperature even after transfer to the refrigerator cooling mode, the batteries 1 are cooled at the maximum air flow rate of the blower 3 (S13, S14).

In the case where it is determined in step S7 that the compressor 10 is operating, the blowing capacity is increased until the battery temperature Tb is reduced to a predetermined temperature or lower while maintaining the internal air cooling mode (S15, S16).

In the case where external air temperature is not higher than the predetermined temperature, the batteries 1 can be cooled in the external air cooling mode. Therefore, the external air introduction mode is kept while increasing the blowing capacity until the battery temperature Tb drops to the predetermined or lower temperature (S17 to S19).

Next, the functions and effects of this embodiment are described.

According to this embodiment, the batteries 1 are cooled by switching between the internal air blowing mode for sucking air from the inside of the compartment and blowing the air to the batteries 1 and the external air blowing mode for sucking air from the outside of the compartment and blowing the air to the batteries 1. Also, the air is cooled by the cooler 5 only in the internal air blowing mode. As a result, the batteries 1 can be cooled without being greatly affected by disturbances such as the heat of an exhaust pipe and sunlight.

Further, the batteries 1 can be sufficiently cooled without increasing the heat radiation area, i.e. the surface area of the batteries 1 and, therefore, the noise of cooling air can be reduced while at the same time suppressing increases in both size and production cost of the battery.

Also, as the flow rate of air passing through the cooler 5 can be adjusted by the internal/external air switching door 4c, a valve for adjusting the flow rate of refrigerant flowing into the cooler 5 can be eliminated.

(Second Embodiment)

Figure 3:
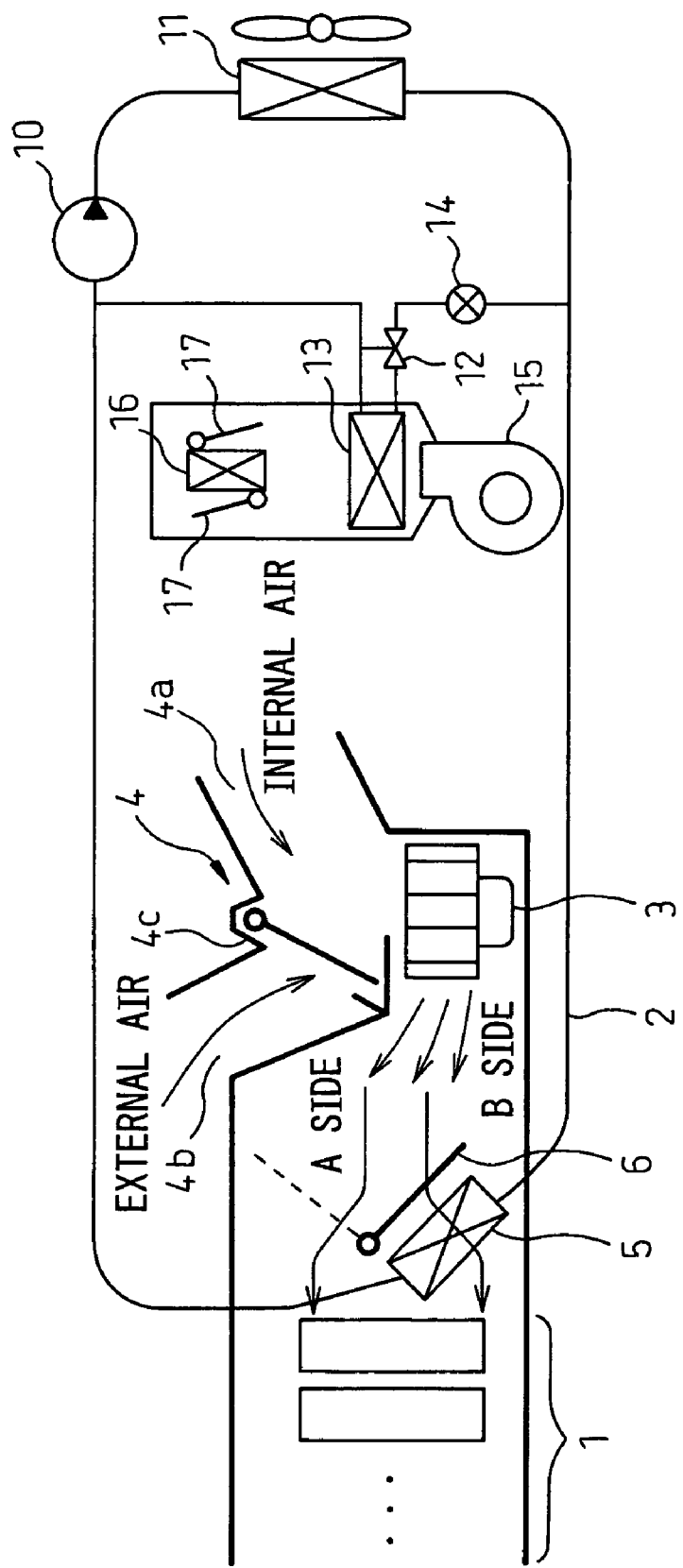
FIG. 3 is a schematic diagram showing a battery cooling apparatus according to a second embodiment of the invention.

According to this embodiment, as shown in FIG. 3, the cooler 5 is arranged downstream of the blower 3 in the air flow, and the cooling air passing through the cooler 5 is controlled by the switching door 6.

Specifically, in the external cooling mode and the internal cooling mode, the core portion of the cooler 5 is closed by the switching door 6, so that the cooling air blown from the blower 3 is supplied to the batteries 1 after bypassing the cooler 5. In the refrigerator cooling mode, on the other hand, substantially all the cooling air blown from the blower 3 is led to the cooler 5 and the cooling air is cooled thereby to cool the batteries 1.

According to this embodiment, as described above, the external air cooling mode is carried out by operating the blower 3 in the external air introducing mode with the core portion of the cooler 5 closed by the switching door 6; the internal air cooling mode is carried out by operating the blower 3 in the internal air introducing mode with the core portion of the cooler 5 closed by the switching door 6; and the refrigerator cooling mode is carried out by introducing substantially all the cooling air supplied from the blower 3 to the cooler 5 in the internal air introducing mode.

Figure 4B:
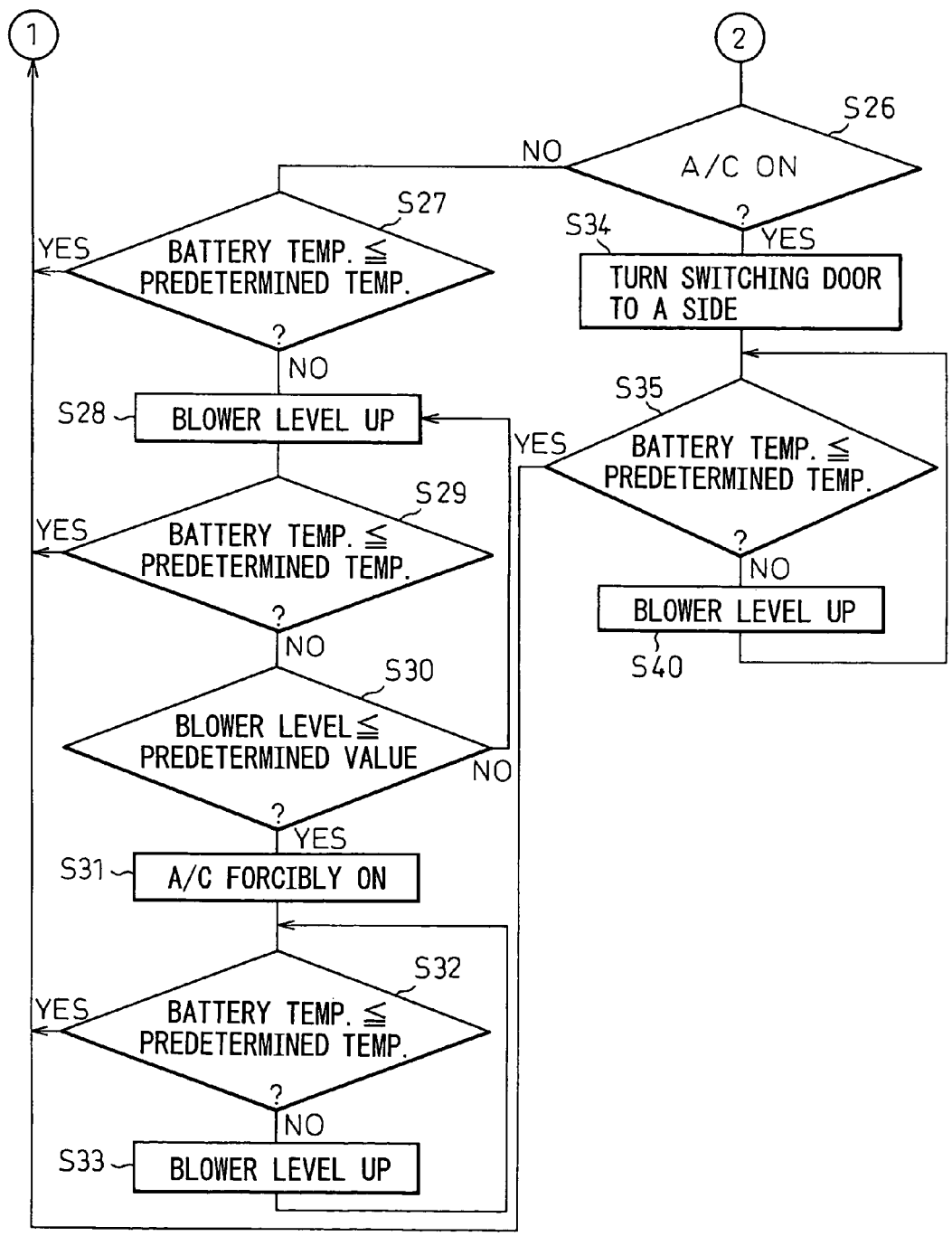
FIG. 4B is a downstream section of the flowchart in FIG. 4A.

FIGS. 4A and B is a control flowchart for operating the battery cooling apparatus shown in FIG. 3 in the same manner as the battery cooling apparatus according to the first embodiment.

(Other Embodiments)

In the embodiments described above, the blowing capacity is controlled in steps. This invention, however, is not limited to these embodiments, but, for example, the blowing capacity may be controlled steplessly.

Also, in the embodiments described above, the batteries begin to be cooled in the external air introducing mode. The invention is not limited to such a method. As an alternative, the internal air temperature and the external air temperature are compared with each other, for example, and when the internal air temperature is lower than the external air temperature, the batteries may be cooled in the internal air introducing mode.

Further, in the embodiments described above, an evaporator is used as the cooler 5 and the compressor 10 doubles as the air-conditioning compressor 10. Nevertheless, the invention is not limited to such a configuration.

Furthermore, the battery cooling apparatus according to this invention has a feature that the air passing through the cooler 5 is supplied to the batteries 1, and only the internal air, but not the external air, is passed through the cooler 5 and, therefore, the present invention is not limited to the embodiment described above.

While the invention has been described by reference to specific embodiments chosen for the purposes of illustration, it should be apparent that numerous modifications could be made thereto by those skilled in the art without departing from the basic concept and scope of the invention.

The invention claimed is:

1. A battery cooling apparatus for cooling a battery mounted on an automotive vehicle, comprising:
    blowing means having an internal air blowing mode for sucking air from an inside of a compartment of the vehicle and blowing the air from the inside of the compartment to said battery, and an external air blowing mode for sucking air from an outside of the compartment and blowing the air from the outside of the compartment to said battery;
    cooling means for cooling the air blown to said battery only in said internal air blowing mode; and
    mode setting means for selecting one of:
        an external air cooling mode for cooling said battery with the air from the outside of the compartment;
        an internal air cooling mode for cooling said battery with the air from the inside of the compartment; and
        a refrigerator cooling mode for cooling said battery with the air from the inside of the compartment cooled by said cooling means; wherein
    said cooling means use refrigerant for an air conditioner for the compartment;
    said mode setting means comprise an internal/external air switching unit controlled by an electronic control device; and
    said electronic control device selects the refrigerator cooling mode in case where a battery temperature Tb fails to drop to a predetermined temperature, in the internal air cooling mode, and forcibly operates a compressor of the air conditioner.

2. A battery cooling apparatus for cooling a battery mounted on an automotive vehicle, comprising:
    a blower for blowing air to said battery;
    an internal/external air switching unit arranged on an inlet side of said blower for controlling flow rate of the air, from an inside of a compartment of the vehicle, supplied to the blower and flow rate of the air, from an outside of the compartment, supplied to the blower;
    cooling means arranged in an air path leading from an internal air inlet of said internal/external air switching unit to the inlet side of said blower for cooling the air; and mode setting means for selecting one of:
- an external air cooling mode for cooling said battery with the air from the outside of the compartment;
- an internal air cooling mode for cooling said battery with the air from the inside of the compartment; and
- a refrigerator cooling mode for cooling said battery with the air from the inside of the compartment cooled by said cooling means; wherein said cooling means use refrigerant for an air conditioner for the compartment;

said mode setting means comprise an internal/external air switching unit controlled by an electronic control device; and said electronic control device selects the refrigerator cooling mode, in case where a battery temperature Tb fails to drop to a predetermined temperature, in the internal air cooling mode, and forcibly operates a compressor of the air conditioner.

3. A battery cooling apparatus according to claim 2;
wherein said internal/external air switching unit includes an internal air inlet for sucking said air from the inside of the compartment, an external air inlet for sucking said air from the outside of the compartment, and an internal/external air switching door adapted to open or close for switching between said internal air inlet and said external air inlet;

wherein said cooling means is an evaporator for cooling air utilizing the latent heat of vaporization of refrigerant; and wherein said evaporator is always supplied with the refrigerant therein.

4. A battery cooling apparatus according to claim 1, wherein said cooling means comprise a first cooler for mainly air-conditioning the compartment of the vehicle and a second cooler for cooling the battery.

5. A battery cooling apparatus according to claim 2, wherein said cooling means comprise a first cooler for mainly air-conditioning the compartment of the vehicle and a second cooler for cooling the battery.

6. A battery cooling apparatus according to claim 1, wherein said internal/external air switching unit directly introduces external air which does not pass through the compartment of the vehicle.

7. A battery cooling apparatus according to claim 2, wherein said internal/external air switching unit directly introduces external air which does not pass through the compartment of the vehicle.

8. A battery cooling apparatus according to claim 1;
wherein said internal/external air switching unit includes an internal air inlet for sucking said air from the inside of the compartment, an external air inlet for sucking said air from the outside of the compartment, and an internal/external air switching door adapted to open or close for switching between said internal air inlet and said external air inlet;

wherein said cooling means is an evaporator for cooling air utilizing the latent heat of vaporization of refrigerant; and wherein said evaporator is always supplied with the refrigerant therein.

9. A battery cooling apparatus according to claim 1, wherein in the external air cooling mode, the air from the outside of the compartment is blown directly to the battery without passing through the cooling means.

10. A battery cooling apparatus according to claim 2, wherein in the external air cooling mode, the air from the outside of the compartment is blown directly to the battery without passing through the cooling means.

* * * * *